US006603091B2

(12) United States Patent
Hsu et al.

(10) Patent No.: US 6,603,091 B2
(45) Date of Patent: Aug. 5, 2003

(54) CLEANING DEVICE WITH DEEPLY REACHING PLASMA AND ASSISTING ELECTRODES

(75) Inventors: Chia-Yuan Hsu, Tainan (TW); Yong-Hau Foo, Kaohsiung (TW); Paul Hong, Bridgewater, NJ (US)

(73) Assignee: Nano Electronics and Micro System Technologies, Inc., Tainan (TW)

( * ) Notice: Subject to any disclaimer, the term of this patent is extended or adjusted under 35 U.S.C. 154(b) by 0 days.

(21) Appl. No.: 10/115,067

(22) Filed: Apr. 4, 2002

(65) Prior Publication Data

US 2002/0117480 A1 Aug. 29, 2002

Related U.S. Application Data

(62) Division of application No. 09/742,430, filed on Dec. 22, 2000, now Pat. No. 6,476,341.

(30) Foreign Application Priority Data

Mar. 13, 2000 (TW) ....................................... 89104472 A
Mar. 14, 2000 (TW) ....................................... 89204026 U

(51) Int. Cl.[7] ................................................ B23K 10/00
(52) U.S. Cl. ........................... 219/121.43; 219/121.52; 219/121.36; 219/121.4; 156/345
(58) Field of Search ......................... 219/121.4, 121.41, 219/121.43, 121.54, 121.59; 204/298.21; 156/345, 643.1, 646.1

(56) References Cited

U.S. PATENT DOCUMENTS

| | | | |
|---|---|---|---|
| 5,238,519 | A | 8/1993 | Nath et al. |
| 5,464,499 | A | 11/1995 | Moslehi et al. |
| 6,198,067 | B1 | 3/2001 | Ikeda et al. |

*Primary Examiner*—Mark Paschall
(74) *Attorney, Agent, or Firm*—Rosenberg, Klein & Lee

(57) ABSTRACT

A cleaning device with deeply reaching plasma and assisting electrodes has supporting racks, a chamber, a plasma sources, metallic grids. Flat boards to be cleaned such as circuit boards are located in the supporting racks. The supporting racks are disposed in the chamber. The metallic grids are disposed on two sides of the chamber. The plasma source is disposed next to the metallic grids. Electric voltage is applied to the metallic grids such that plasma from the plasma source can be pushed deeply into the supporting racks to evenly and sufficiently clean the circuit boards.

24 Claims, 23 Drawing Sheets

CLEANING DEVICE WITH DEEPLY REACHING PLASMA AND ASSISTING ELECTRODES

This application is a division of Ser. No. 09/742,430 filed Dec. 22, 2000 now U. S. Pat. No. 6,476,341.

BACKGROUND OF THE INVENTION

The present invention relates to a cleaning device with deeply reaching plasma and assisting electrodes, and particularly to one which is used in cleaning flat-board shaped things such as silicon wafers, Cu lead frames, etc.

In the process of making integrated circuits, the integrated circuits can have dirt unwarily attached to them because of the manufacturing conditions and dust in the environment. Therefore, it is necessary that the dirt and dust are removed from the integrated circuits. Otherwise, other necessary materials cannot be appropriately attached to the integrated circuits.

Cleaning devices for integrated circuits can also be used in surface processing, and plating such as plasma ashing of silicon, removing of passivation layer.

However, the inventor of the present invention found that conventional cleaning devices with plasma could not clean the circuits very sufficiently because the plasma could not reach deeply enough.

SUMMARY OF THE INVENTION

Therefore, it is a main object of the present invention to provide a cleaning device with deeply reaching plasma and assisting electrodes such that the circuits can be sufficiently cleaned.

The cleaning device deeply reaching plasma and assisting electrodes has:

- several supporting racks; the supporting racks receiving flat boards to be cleaned therein; the supporting racks having openings for permitting the flat boards to be inserted;
- a chamber; the chamber receiving the supporting racks therein;
- several plasma sources; the plasma sources being disposed beside two sides of the supporting racks; the plasma sources being capable of sending out plasma to clean the flat boards;
- several metallic grids; the metallic grids being disposed adjacent to the supporting rocks and the plasma sources; electric voltage being applied to the metallic grids to help the plasma of the plasma sources pushed deeply into the supporting racks for permitting the plasma to clean the flat boards evenly and sufficiently.

BRIEF DESCRIPTION OF THE DRAWINGS

This invention will be better understood by referring to the accompanying drawings, wherein.

DESCRIPTION OF THE PREFERRED EMBODIMENTS

Figure 1:
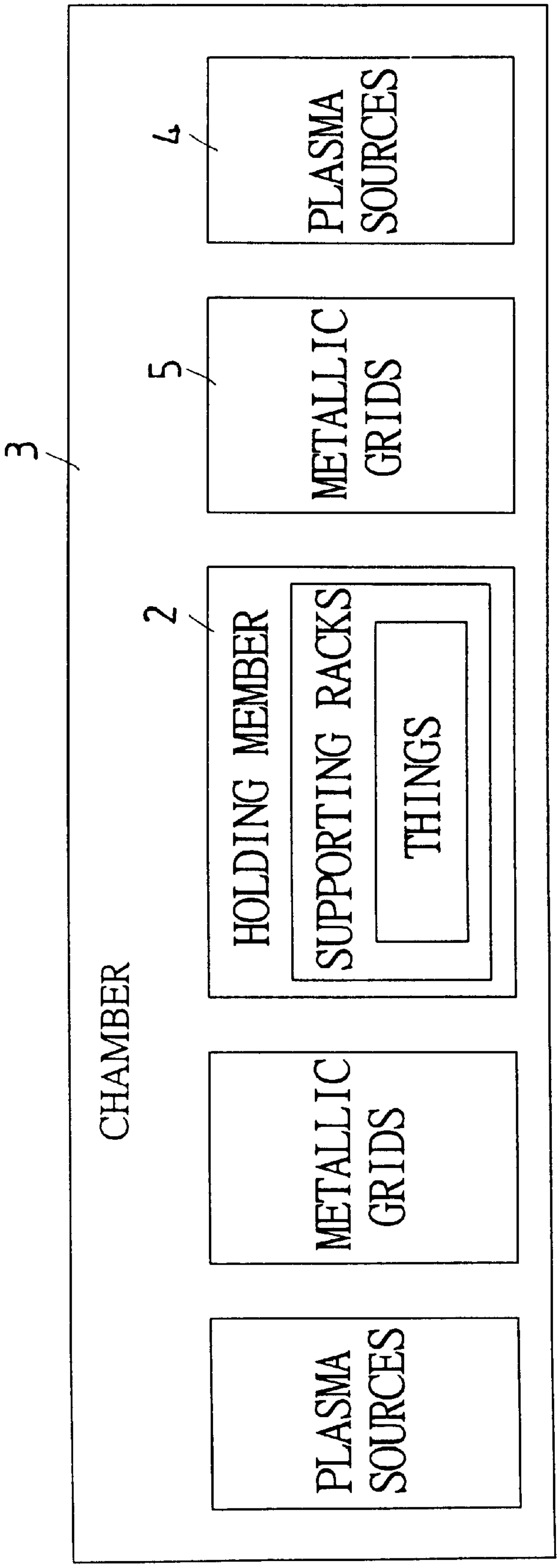
FIG. 1 is a block diagram of the structure of the cleaning device of the present invention.
Figure 2:
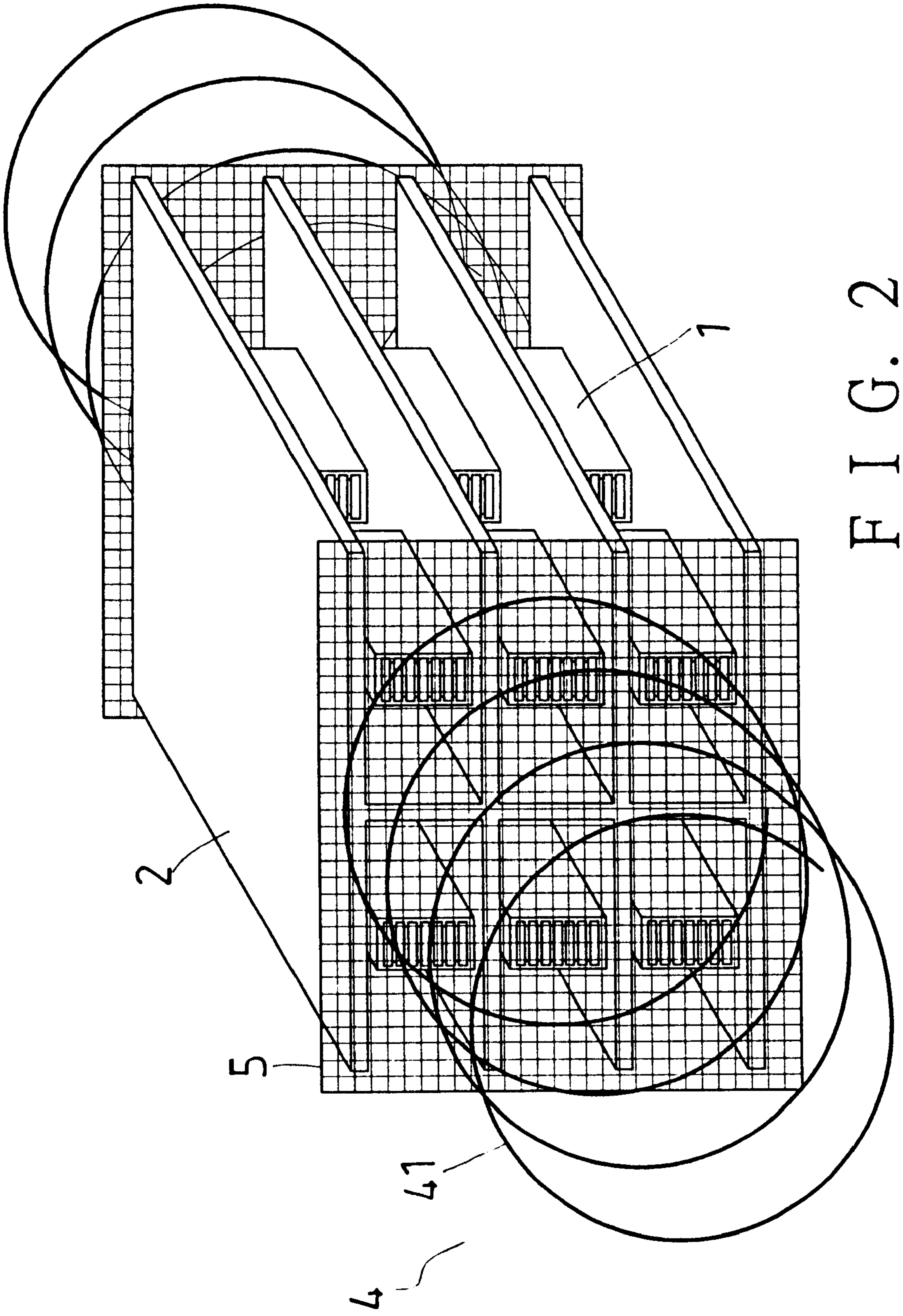
FIG. 2 is a view of the cleaning device of the present invention with inductively coupling plasma.
Figure 3:
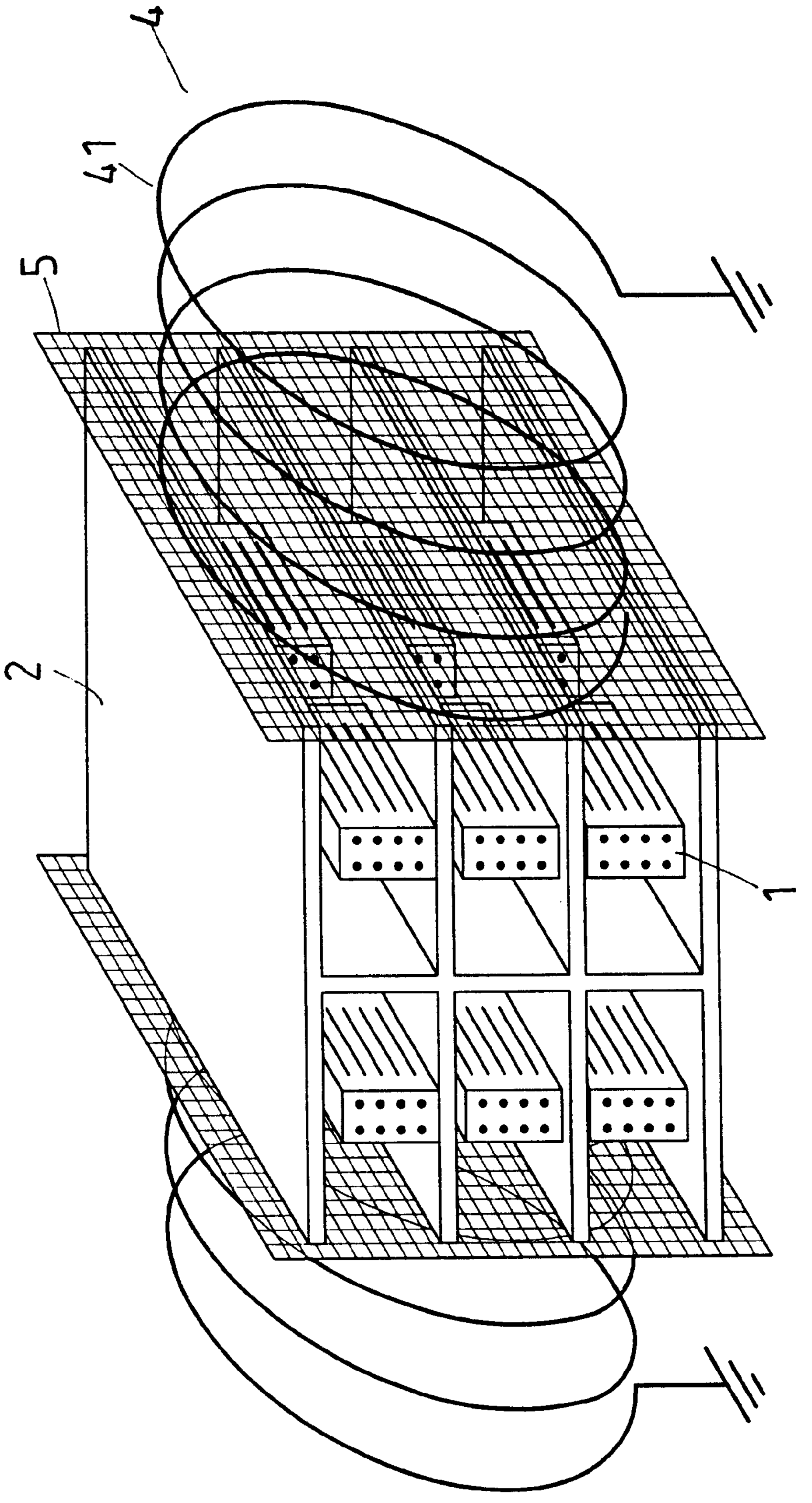
FIG. 3 is a view of the cleaning device with inductively coupling plasma according to a second embodiment of the present invention.
Figure 4:
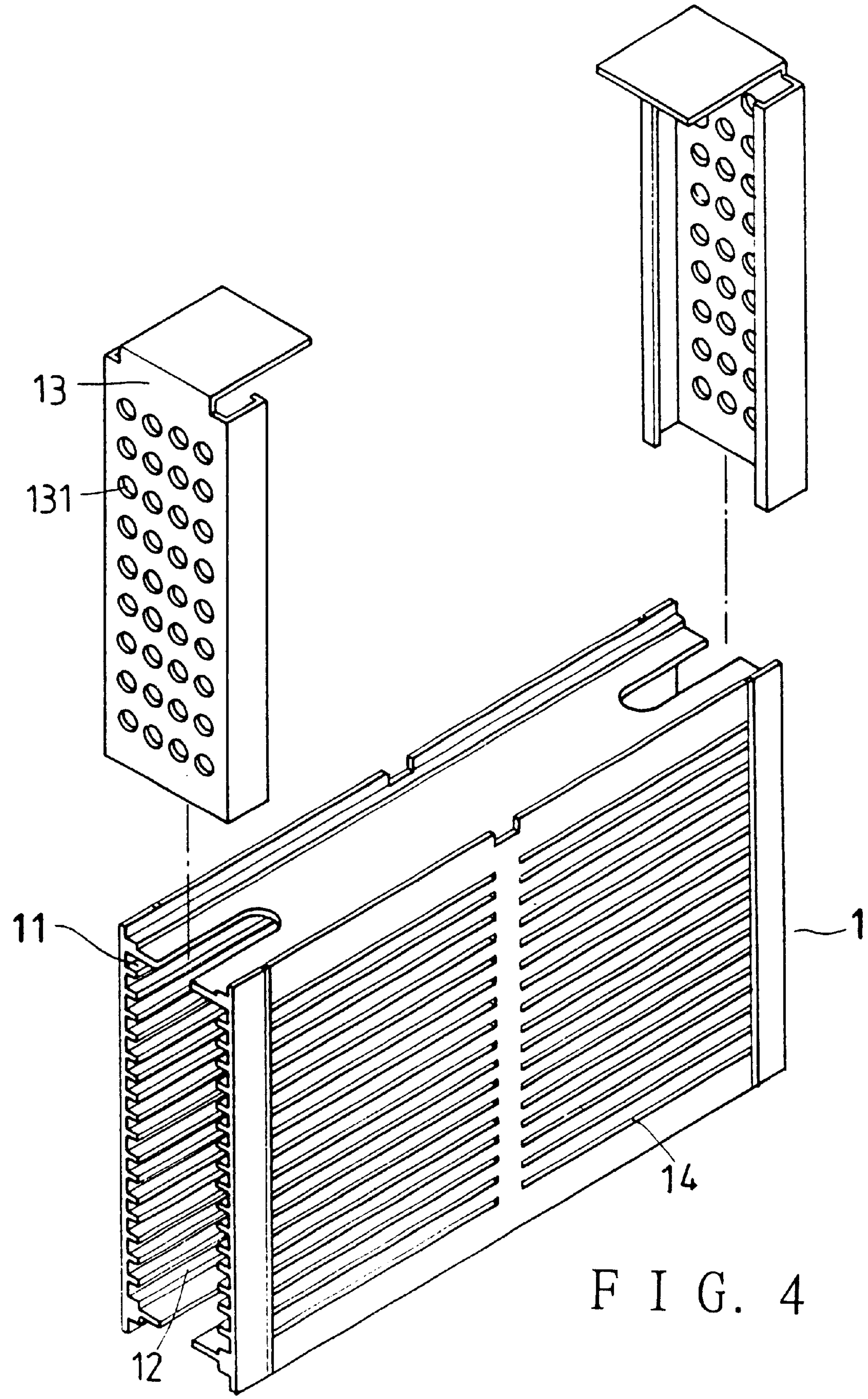
FIG. 4 is an exploded perspective view of the supporting rack of the present invention.
Figure 5:
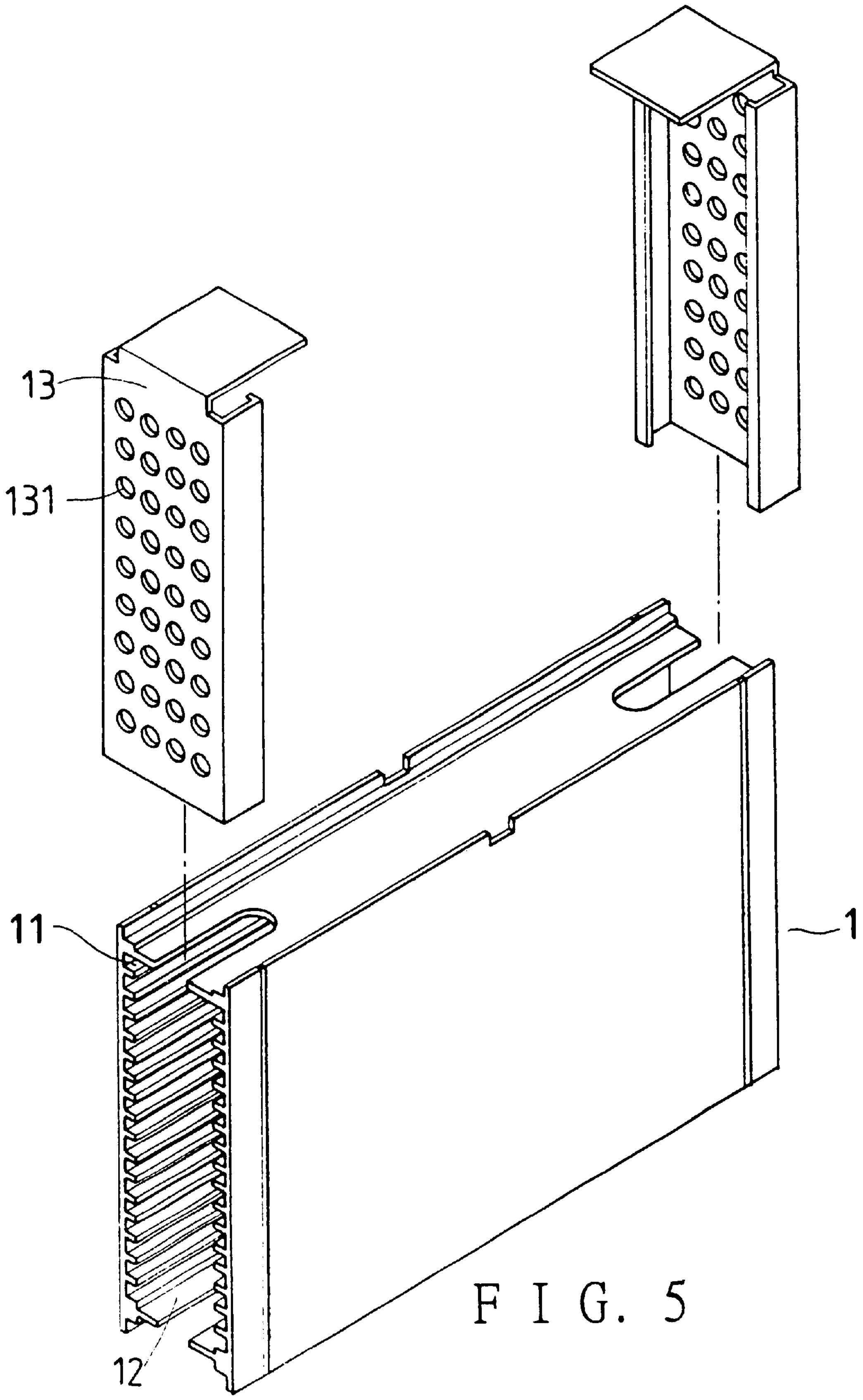
FIG. 5 is another supporting rack according to the present invention.
Figure 6:
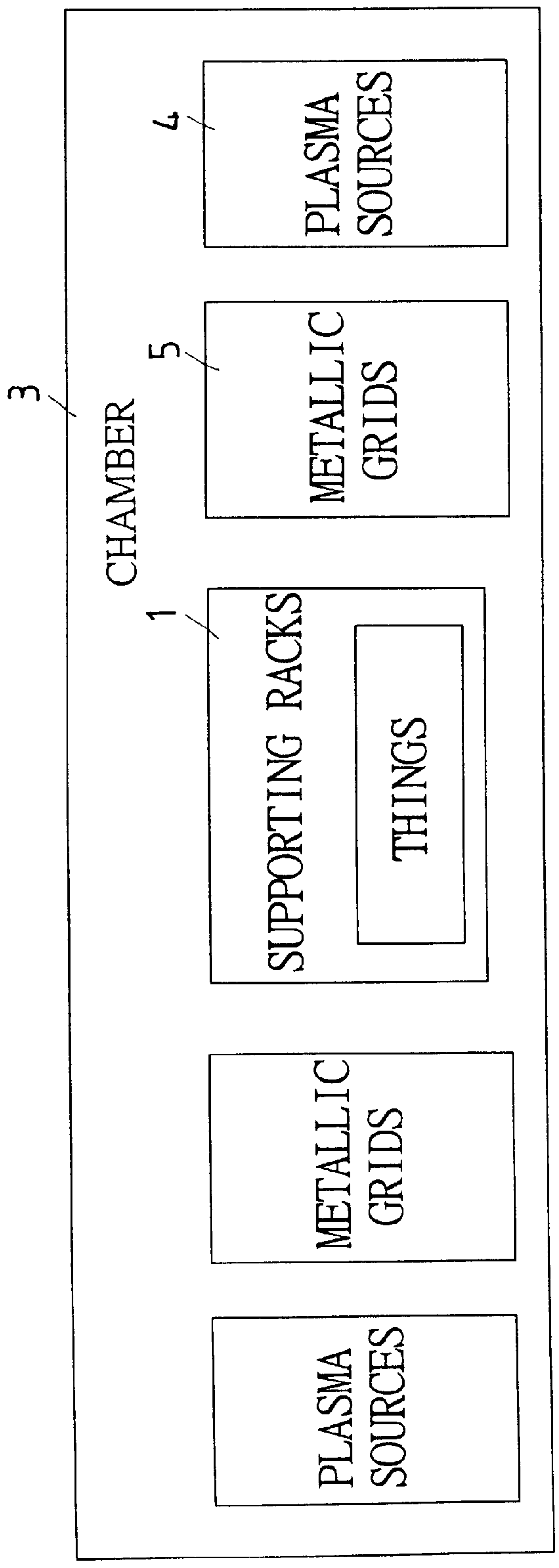
FIG. 6 is a block diagram of the structure of the cleaning device without holding members according to the present invention.
Figure 7:
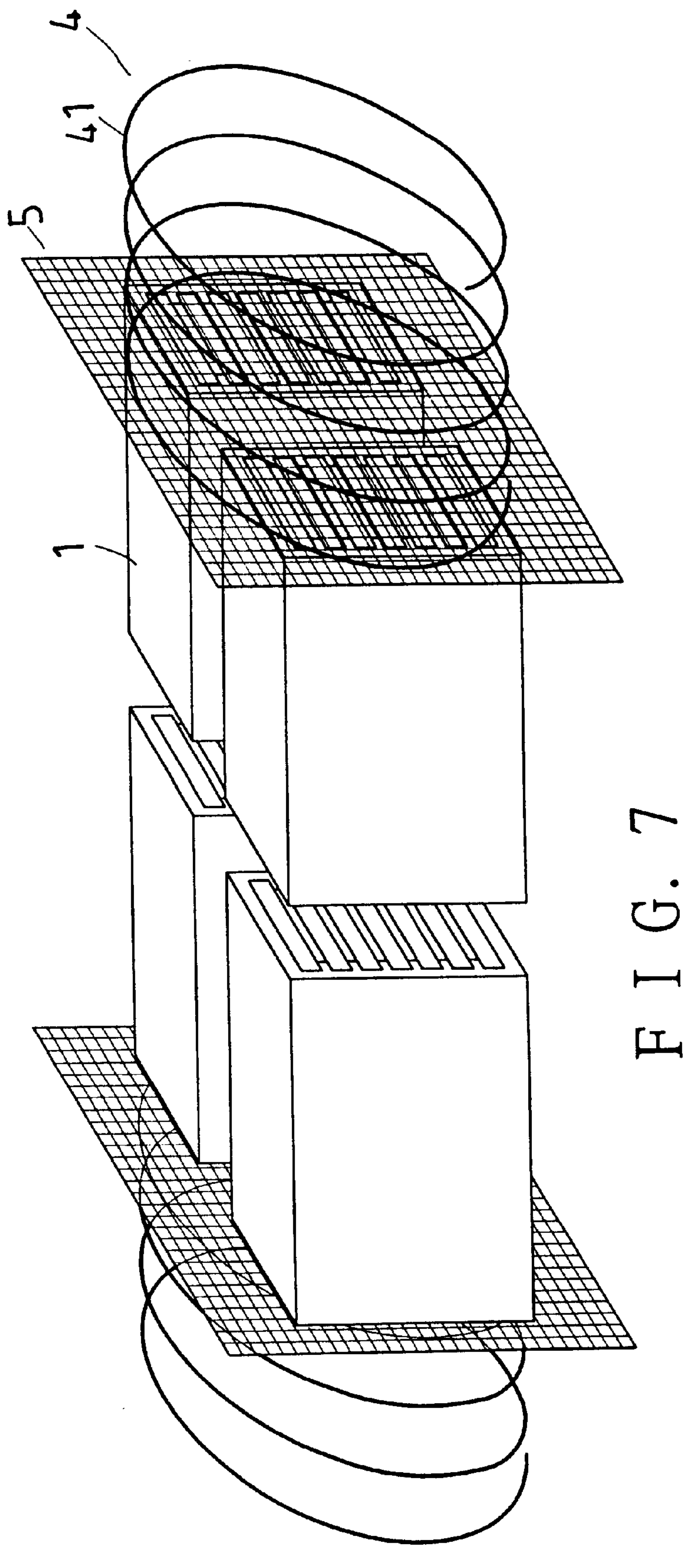
FIG. 7 is a view of the cleaning device of inductively coupling plasma without holding members.
Figure 8:
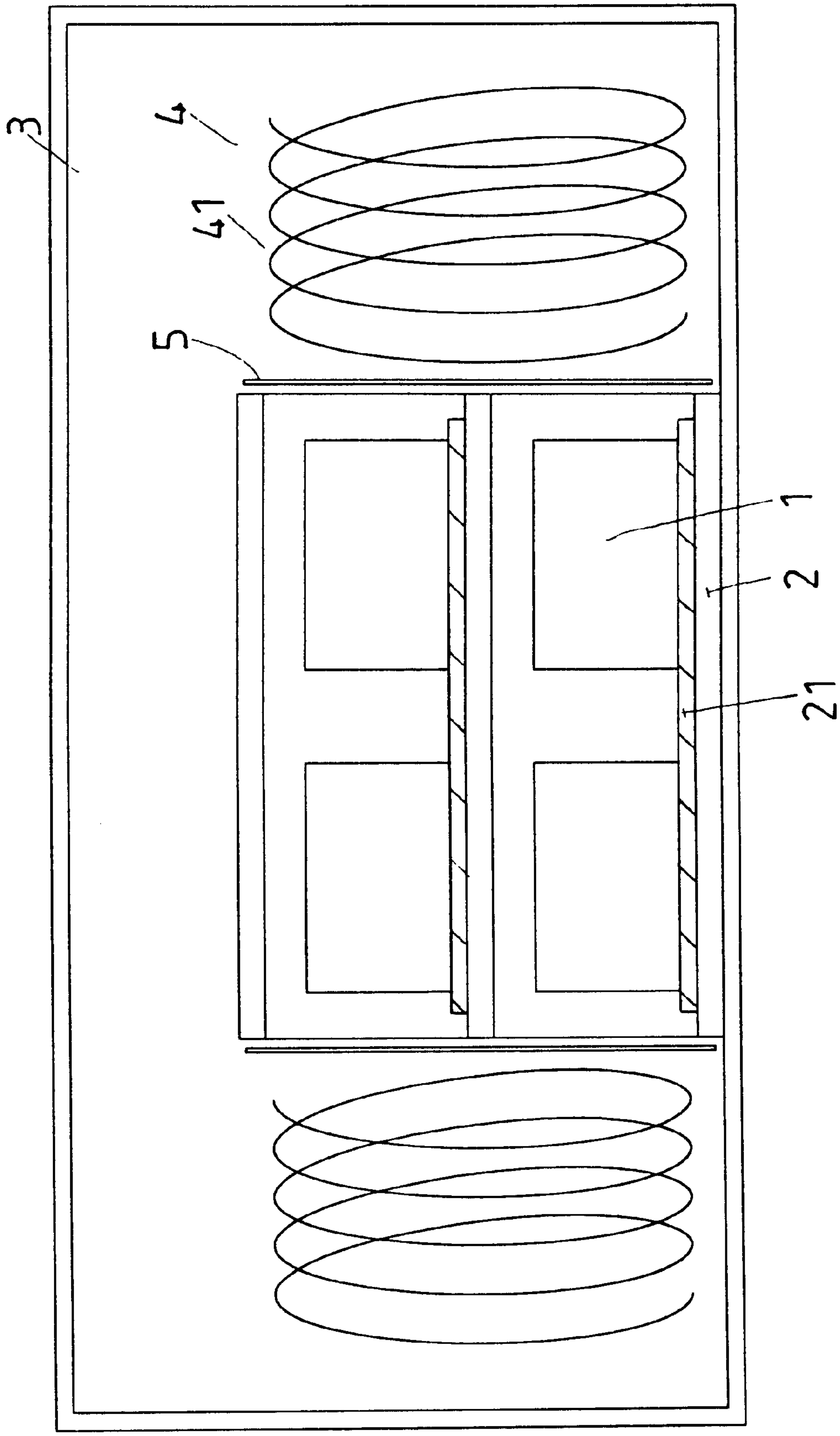
FIG. 8 is a view of the cleaning device with insulating cushions of a first type.

Referring to FIGS. 1, 2 and 3, the cleaning device with deeply reaching plasma and assisting electrodes of the present invention includes:

- several supporting racks 1; referring to FIGS. 4 and 5, the racks 1 each has openings 12 on a front side and a rear side and support protrusions 11. Thus, flat boards, and held in position by the support protrusions 11. The racks 1 are further provided with covers 13 having through holes 131. The covers 13 are fitted to the front and the rear sides of the racks 1. The racks 1 can also be used without the covers 13 fitted to them. The racks 1 are each provided with elongated holes 14 on two lateral sides. The racks 1 can also be provided without elongated holes 14 on two lateral sides. The openings 12, the through holes 131 and the elongated holes 14 can help plasma sent into the racks easily;
- a holding member 2; the holding member 2 can be made of insulated materials and conductive materials as well;

the holding member 2 can hold the supporting racks 1; the cleaning device also can be used without the holding member 2 provided in it, when the holding member 2 is not used, the supporting racks 1 are piled up as shown in FIGS. 6, 7 and 8; there can be more than one holding members 2;

a chamber 3; the chamber 3 has a room in it; the supporting racks 1 and the holding members 2 are received in the chamber; the chamber 3 can become vacuum by using a vacuum machine;

a plasma source 4; the plasma source 4 is disposed on two sides of the supporting racks 1 and the holding member 2; the plasma source 4 can be ICP (inductively-coupling plasma), HCD (hollow cathode discharge), Helicon or CCP (capacity-coupling plasma); there can be more than one plasma sources 4;

a metallic grid 5; the metallic grid 5 is disposed between the supporting racks 1 and the plasma sources 4; when electric voltage is applied to the metallic grid 5, electrons or ions of the plasma are sent into the supporting racks 1; thus, the plasma can reach deeply and have desirable cleaning capability; the meshes of the metallic grid 5 can be rectangular, round, oval or honeycomb-shaped, and is about one to twenty mini meters wide; the metallic grid can be formed by various designs such as it is formed apart by plurality horizontal parallel wires, vertical parallel wires, horizontal oblique wires and vertical oblique wires. The metallic grid 5 can be replaced with metallic plates having through holes on them, the electric voltage applied to the metallic grid 5 can be DCV, unipolar positive or unipolar negative pulse, bipolar pulse or intermediate frequency (40 k–13.56 MHZ)

In using the cleaning device with deeply reaching plasma wherein the holding member 2 is used; referring to FIGS. 1, 2 and 3, the things to be cleaned are inserted into the supporting racks 1 and the supporting racks 1 are disposed in the holding member 2; then, the holding member 2 is disposed in the chamber 3, and the metallic grids 5 and the plasma sources 4 are disposed on two sides of the holding member 2; in using the cleaning device having no holding member 2. Referring to FIGS. 6, 7 and 8, the things to be cleaned are inserted into the supporting racks 1, and the racks 1 are disposed in the chamber 3; then the plasma sources 4 and the metallic grids 5 are disposed on two sides of the supporting racks 1; then, the plasma sources 4 send out plasma, and the bias voltage is applied to the metallic grid 5. Because the holding members 2 are disposed adjacent to the plasma sources 4, the things to be cleaned can be sufficiently contacted by the plasma. And, the plasma can flow evenly between the flat-board shaped things to be cleaned. Because of the electric voltage, the metallic grid 5 has either positive electric field of negative electric field; the positive electric field can push the ions of the plasma into the supporting racks 1, while the negative electric field pushes the electrons of the plasma into the racks 1. That is, the metallic grid 5, having electric voltage, can increase the density of the plasma, and push the ions or the electrons of the plasma into the racks 1 deeply. Thus, the cleaning effectiveness and the evenness of the plasma are obviously increased.

Figure 9:
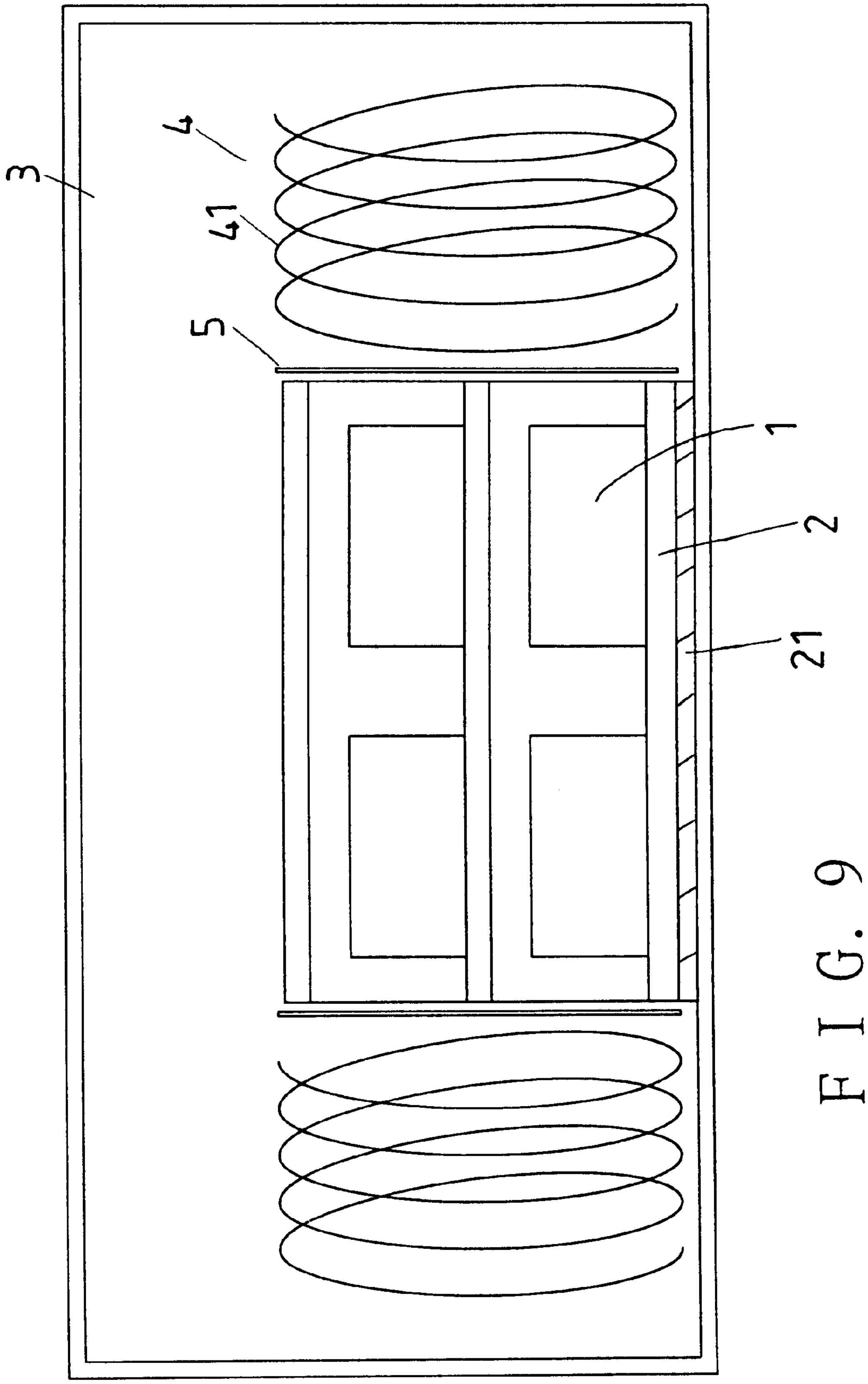
FIG. 9 is a view of the cleaning device with insulating cushions of a second type.

In using the cleaning device with the holding members 2, it doesn't matter whether the holding members 2 and the supporting racks 1 are made of conductive materials or not. When the supporting racks 1 or the holding members 2 are conductive, we can apply positive or negative bias voltage pulse of low frequency (about 0.1–500 KHZ) to attract electrons or ions for spreading the plasma. And, the action strength of the ions can be controlled to achieve optimum cleaning effect. Furthermore, when applying electric voltage to the supporting racks 1 or the holding members 2, the racks 1 and the holding members 2 should be in floating potential type for preventing the bias voltage from being applied on the chamber 3. For example, when the voltage is applied to conductive supporting racks 1, the holding members 2 should be insulated; and, referring to FIG. 9 when both the racks land the holding members 2 are conductive and the voltage is applied to the racks 1, insulating cushions 21 are inserted between the racks 1 and the holding member 2; referring to FIG. 14 when both the racks 1 and the holding members 2 are conductive, and the voltage is applied to the holding members 2, insulating cushions 21 can be inserted between the chamber 3 and the holding members 2.

Figure 10:
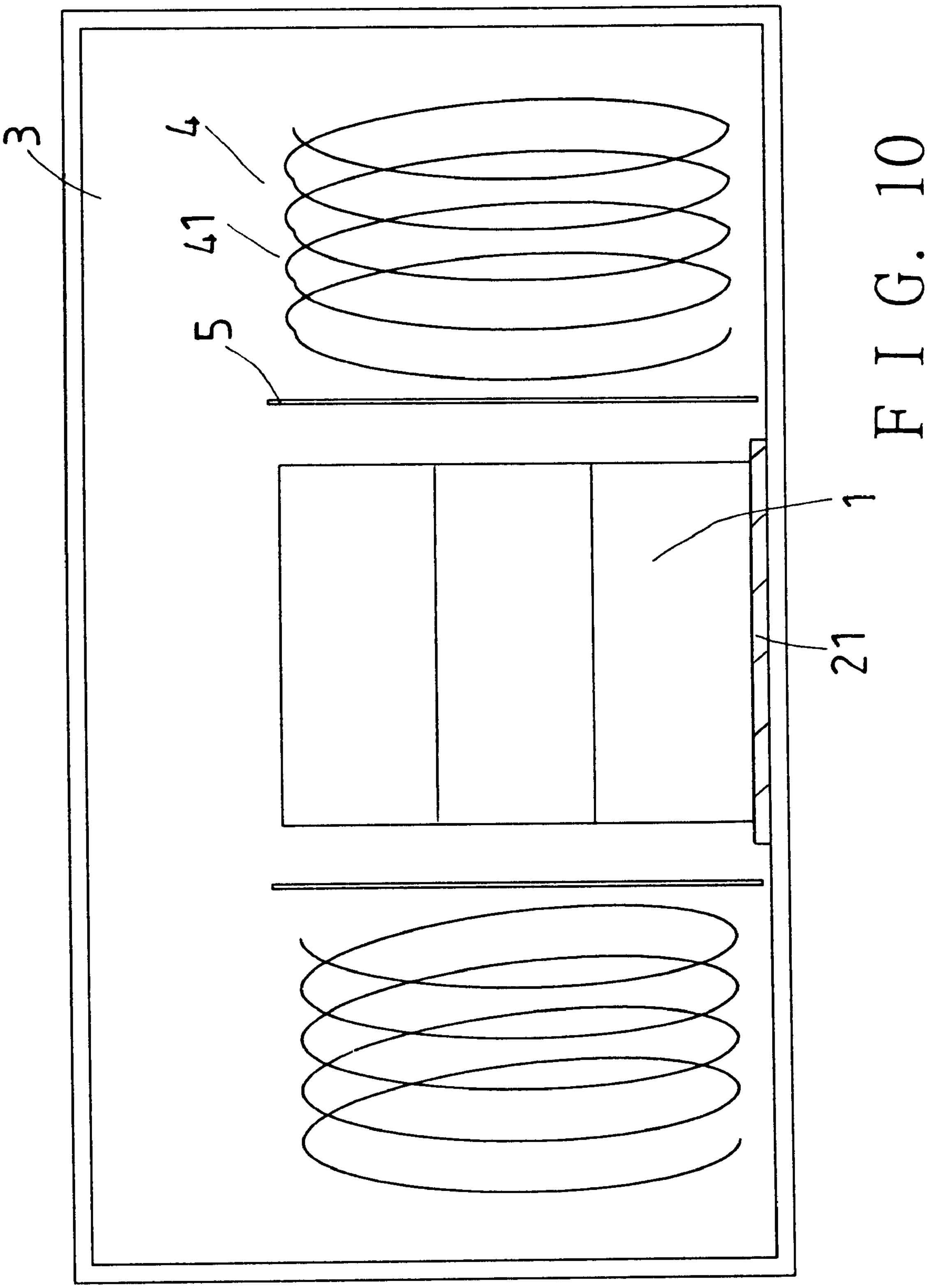
FIG. 10 is a view of the cleaning device with insulating cushions of a third type.

Referring to FIG. 10, when the holding members 2 are not used, the supporting racks 1 are conductive, the racks 1 are piled up or arrayed with a insulating cushion 21 inserted between the lowest one of the racks 1 and the chamber 3 in order to form a floating potential; the voltage applied to the supporting racks 1 can be positive or negative direct current voltage, pulse voltage (about 0.1–500 KHZ), or intermediate frequency alternating current voltage.

Referring to FIGS. 2, 3 and 7, when the plasma source 4 uses inductively-coupling plasma (ICP), the supporting racks 1 or the holding members 2 have antennas 41 disposed on two opposing sides; the antennas 41 can be spiral-shaped, wound up with level-spiral-shaped or flat-spiral-shaped. No matter what kind of shape the antennas 41 have, high frequency power (about 10 k–54.24 MHZ) can be sent through the antennas 41. The antennas 41 can be grounded but they do necessarily have to be grounded. When the antennas 41 are grounded, the potential difference can be reduced, and so the action strength of the ions of the plasma is reduced. When the antennas 41 are not grounded, the potential difference is increased, and so the action strength of the ions is increased. Thus, the action strength of the plasma ions is controlled to achieve optimum cleaning effect.

Figure 11:
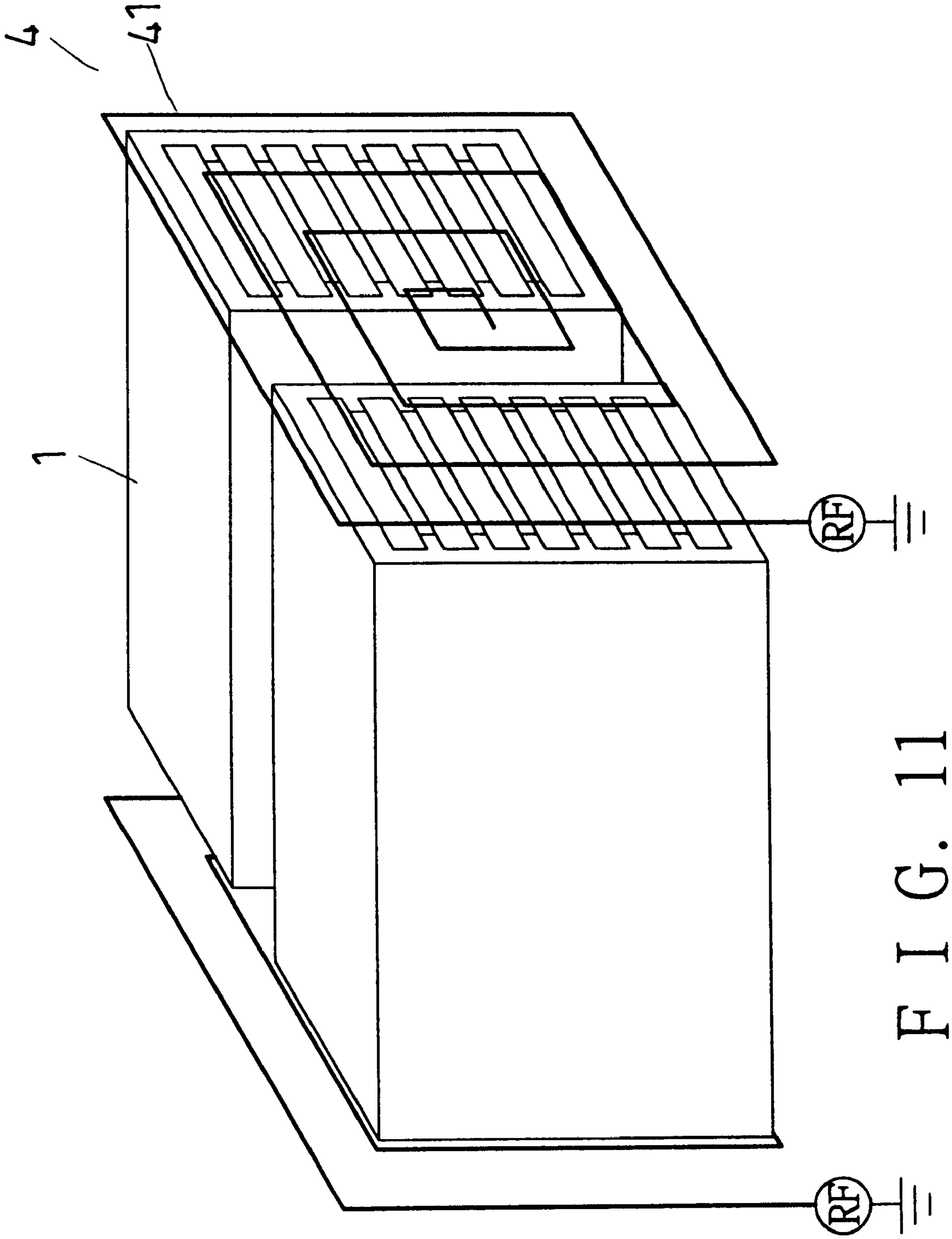
FIG. 11 is a view of the cleaning device with flat-spiral-shaped antennas.

Referring to FIG. 11, if the antennas 41 of the inductively-coupling plasma source are flat-spiral-shaped, and are not grounded, the metallic grid 5 is not a must; the flat-spiral-shaped antennas 41 have negative potential, and therefore have the function of a metallic grid.

Figure 12:
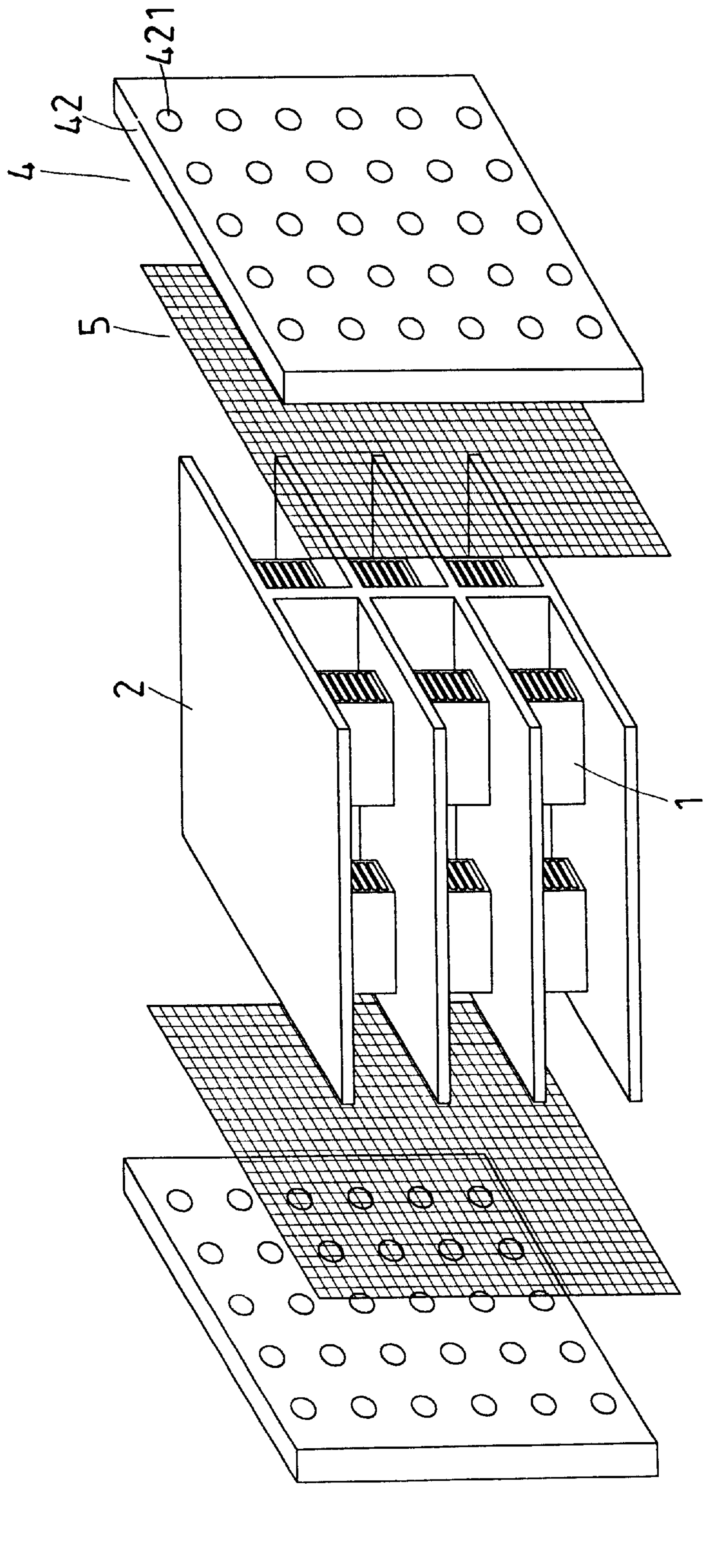
FIG. 12 is a perspective view of the cleaning device with hollow cathode discharge of a first type.
Figure 13:
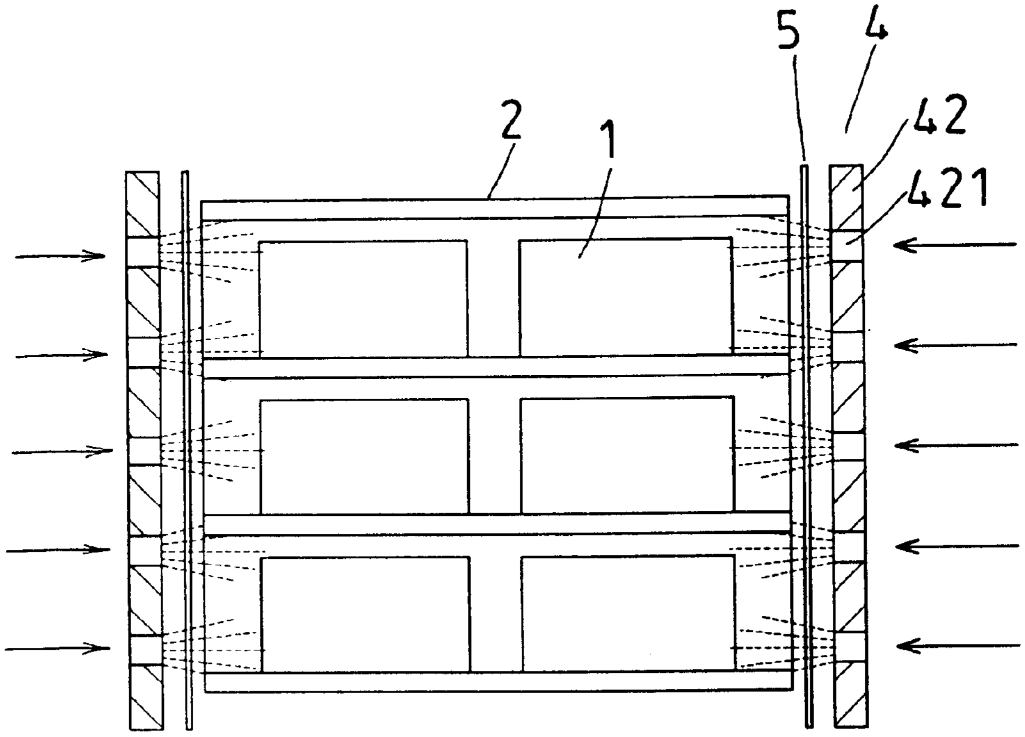
FIG. 13 is side view of the cleaning device in FIG. 12.
Figure 18:
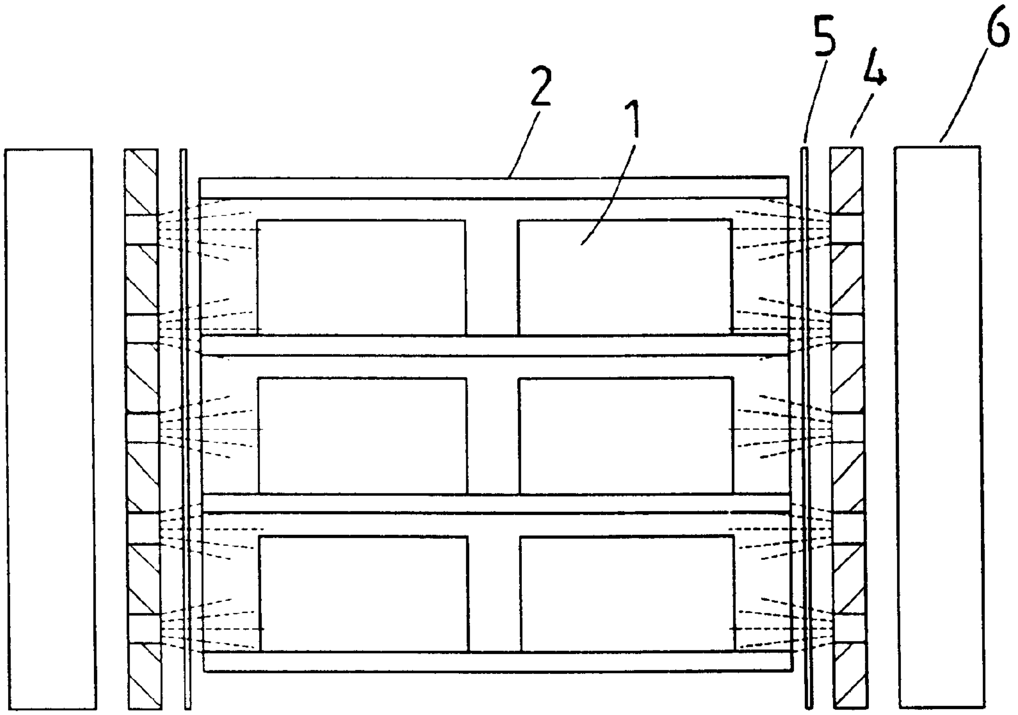
FIG. 18 is a view of cleaning device with magnetic field and holding members type three.
Figure 14:
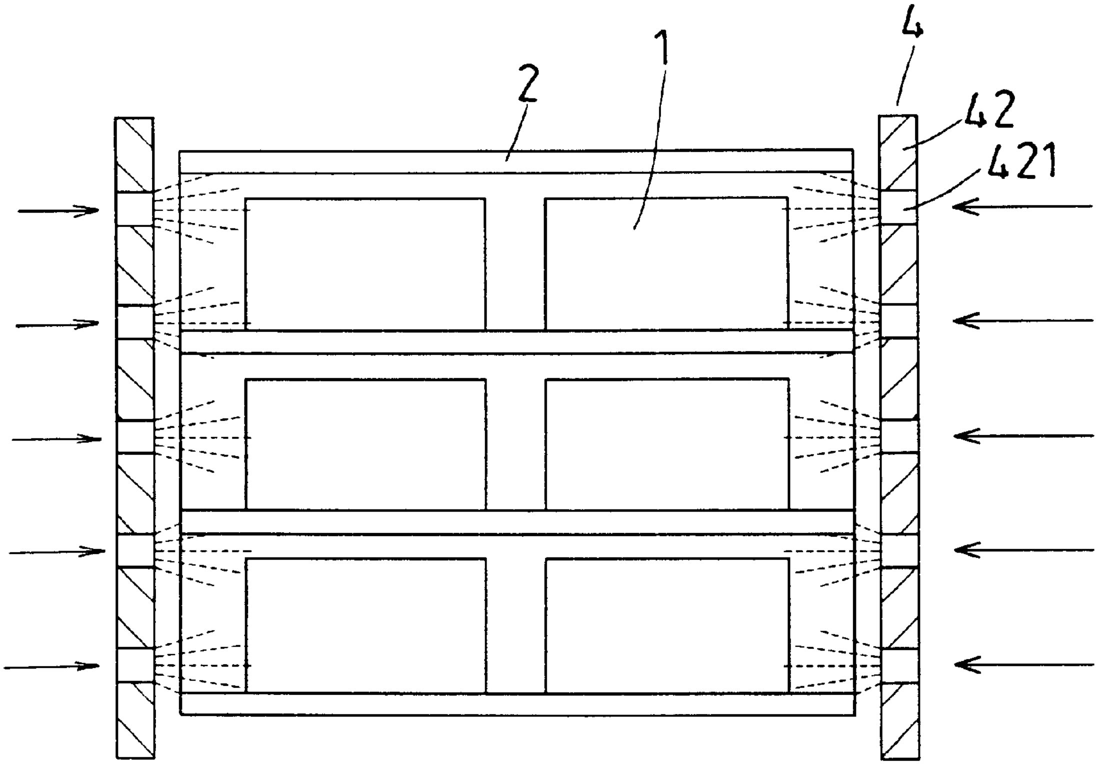
FIG. 14 is a side view of the cleaning device with hollow cathode discharge of a second type.
Figure 15:
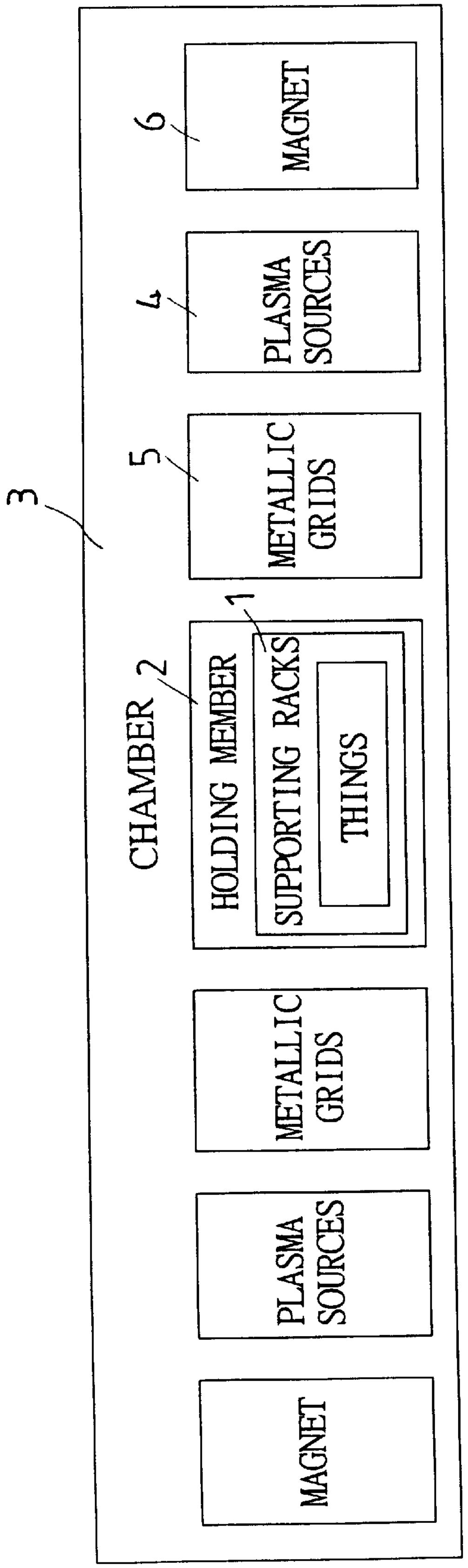
FIG. 15 is a block diagram of the cleaning device with magnetic field and holding member.
Figure 16:
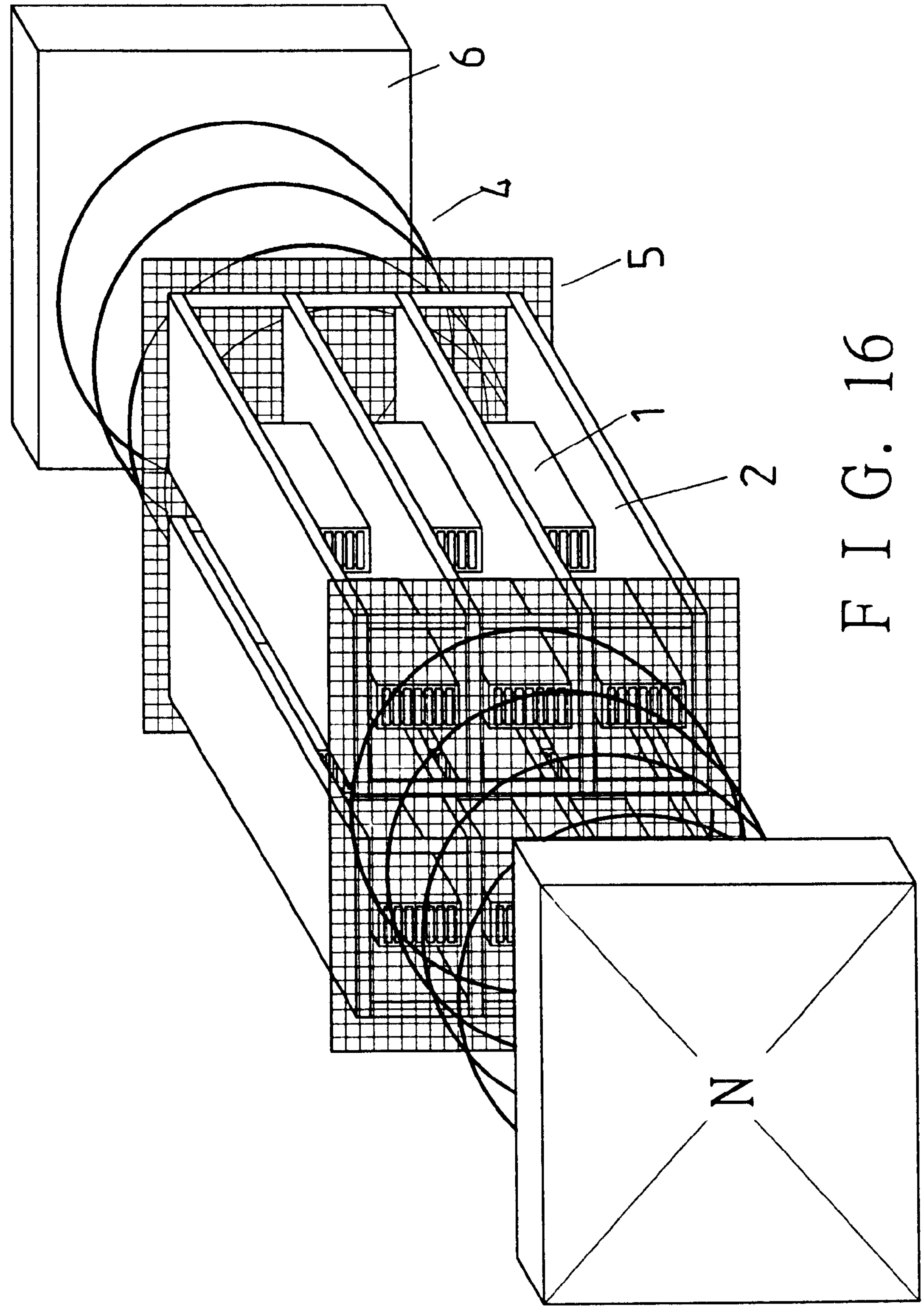
FIG. 16 is a view of the cleaning device with magnetic field and holding member type one.
Figure 17:
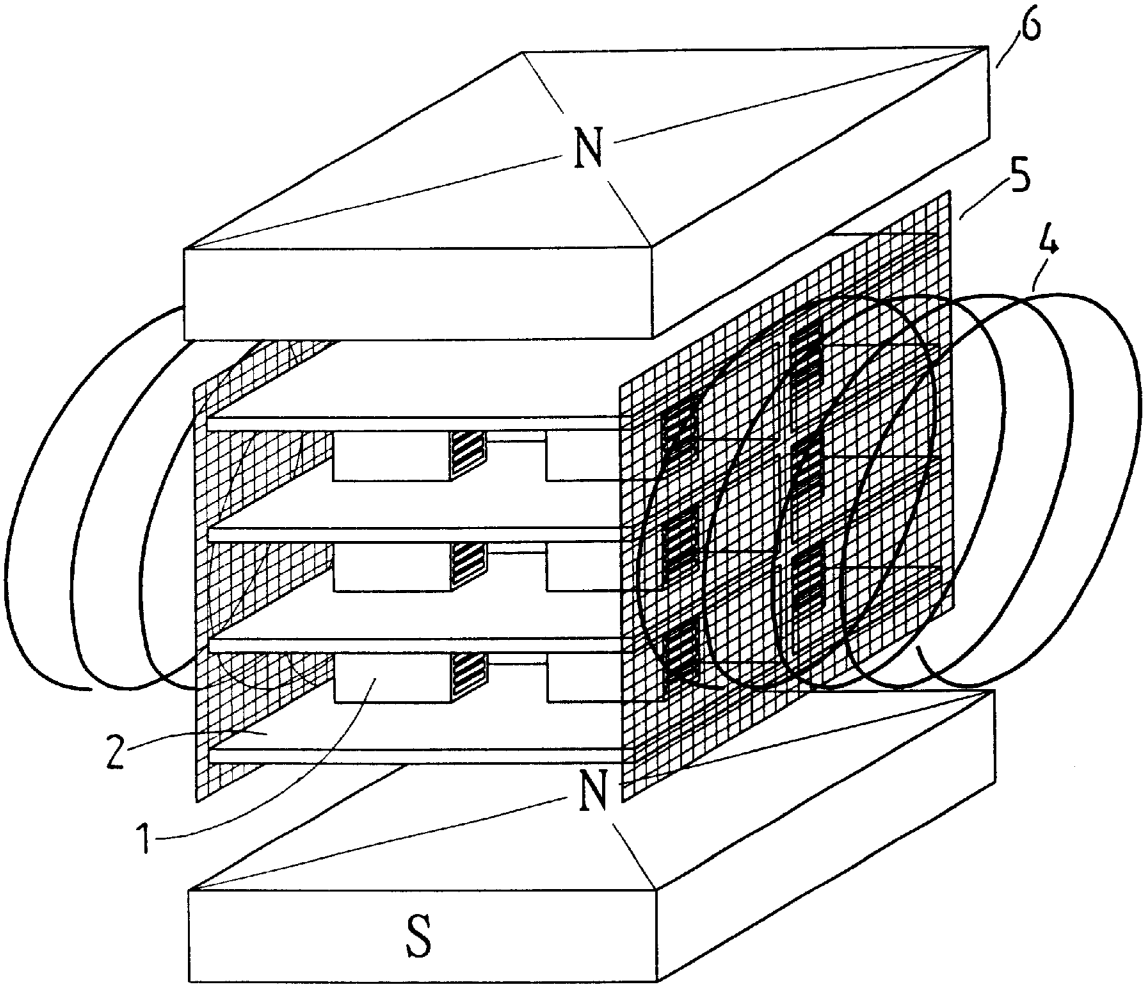
FIG. 17 is a view of the cleaning device with magnetic field and holding members type two.
Figure 19:
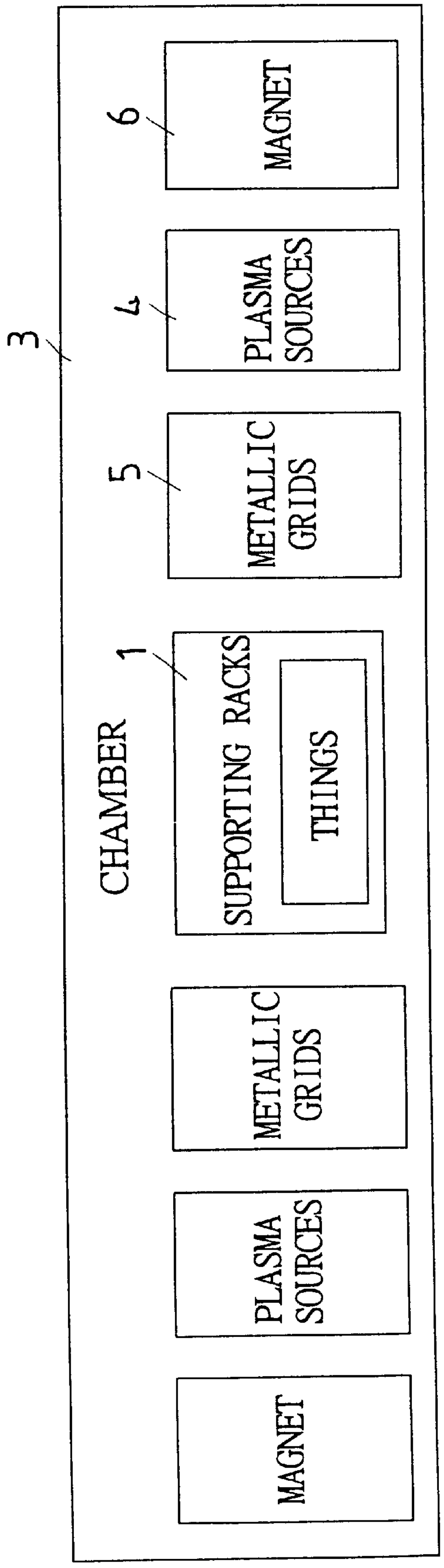
FIG. 19 is a block diagram of the cleaning device with magnetic field, without holding members according to the present invention.
Figure 20:
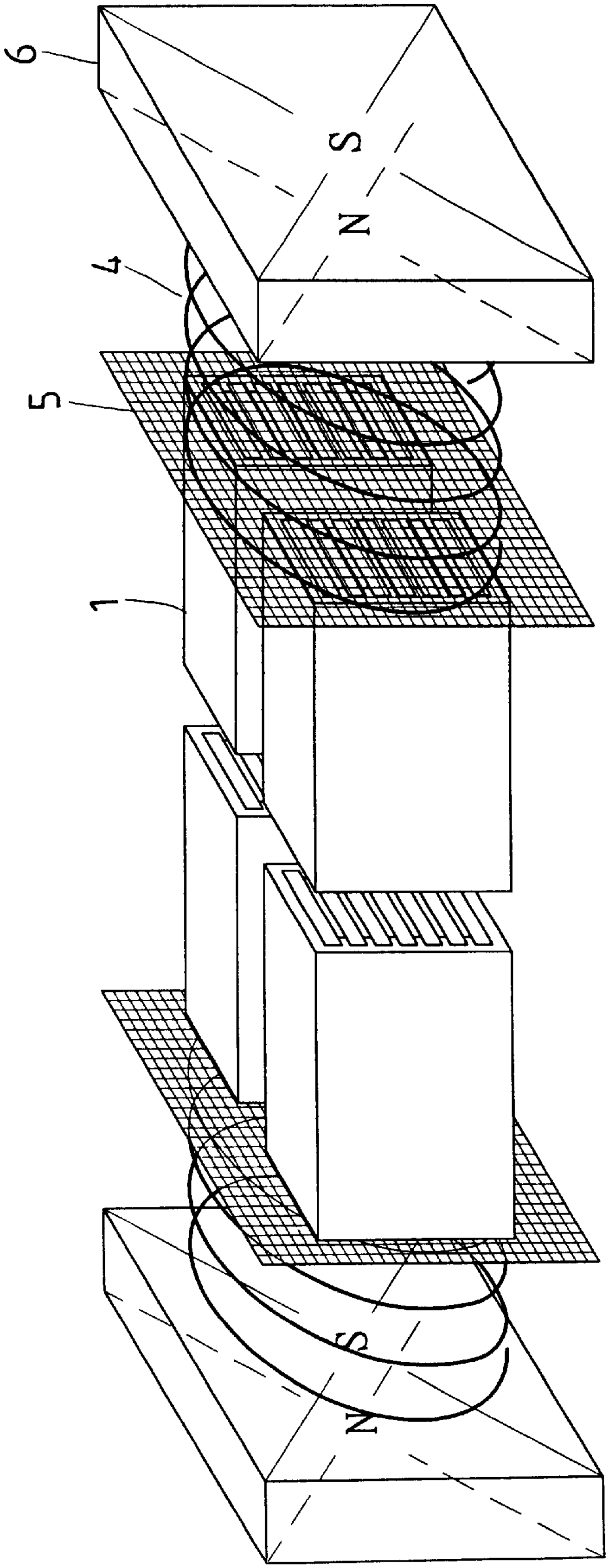
FIG. 20 is a view of the cleaning device with magnetic field, without holding members, type one.
Figure 21:
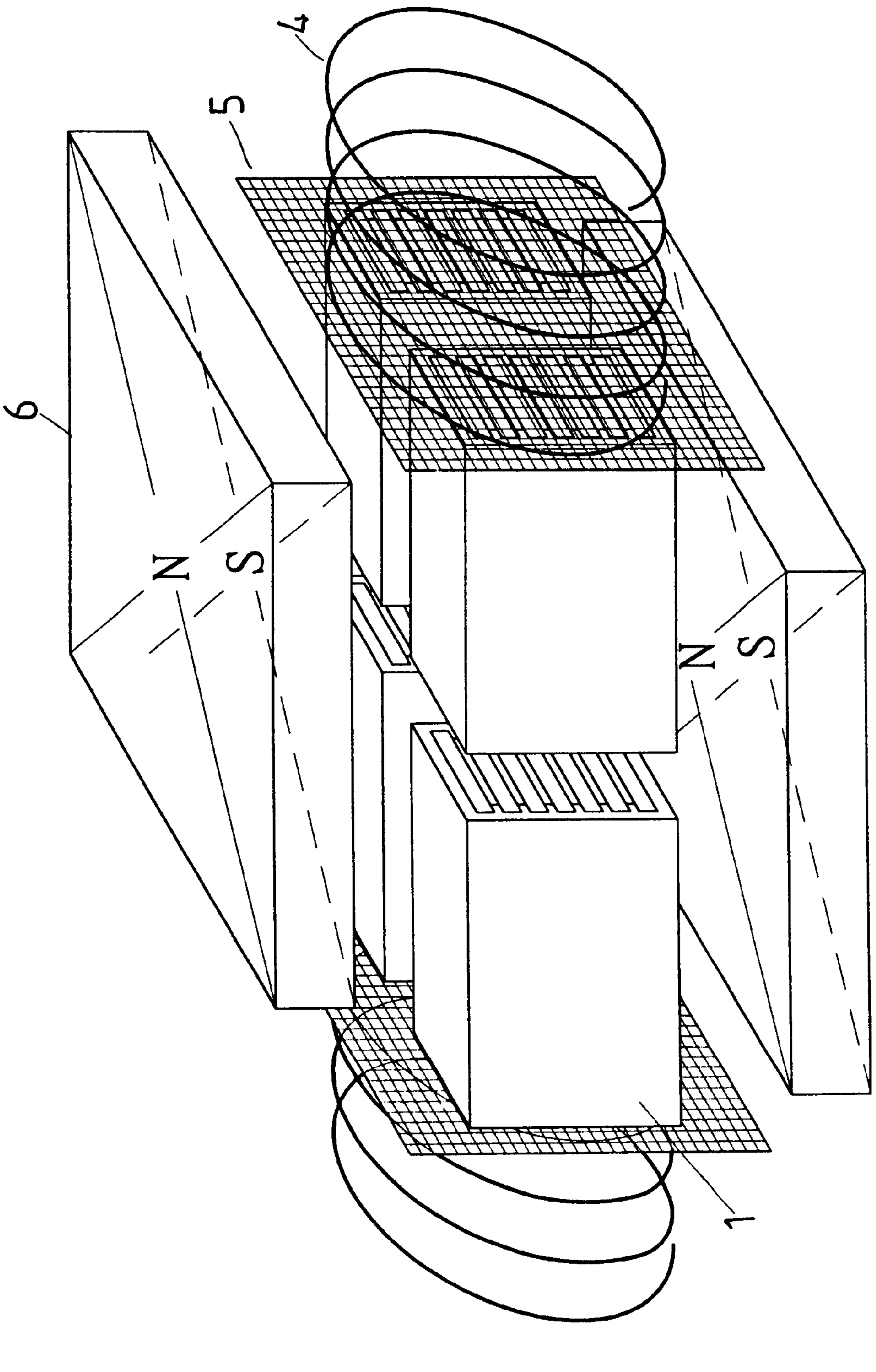
FIG. 21 is a view of the cleaning device with magnetic field, without holding members, type two.
Figure 22:
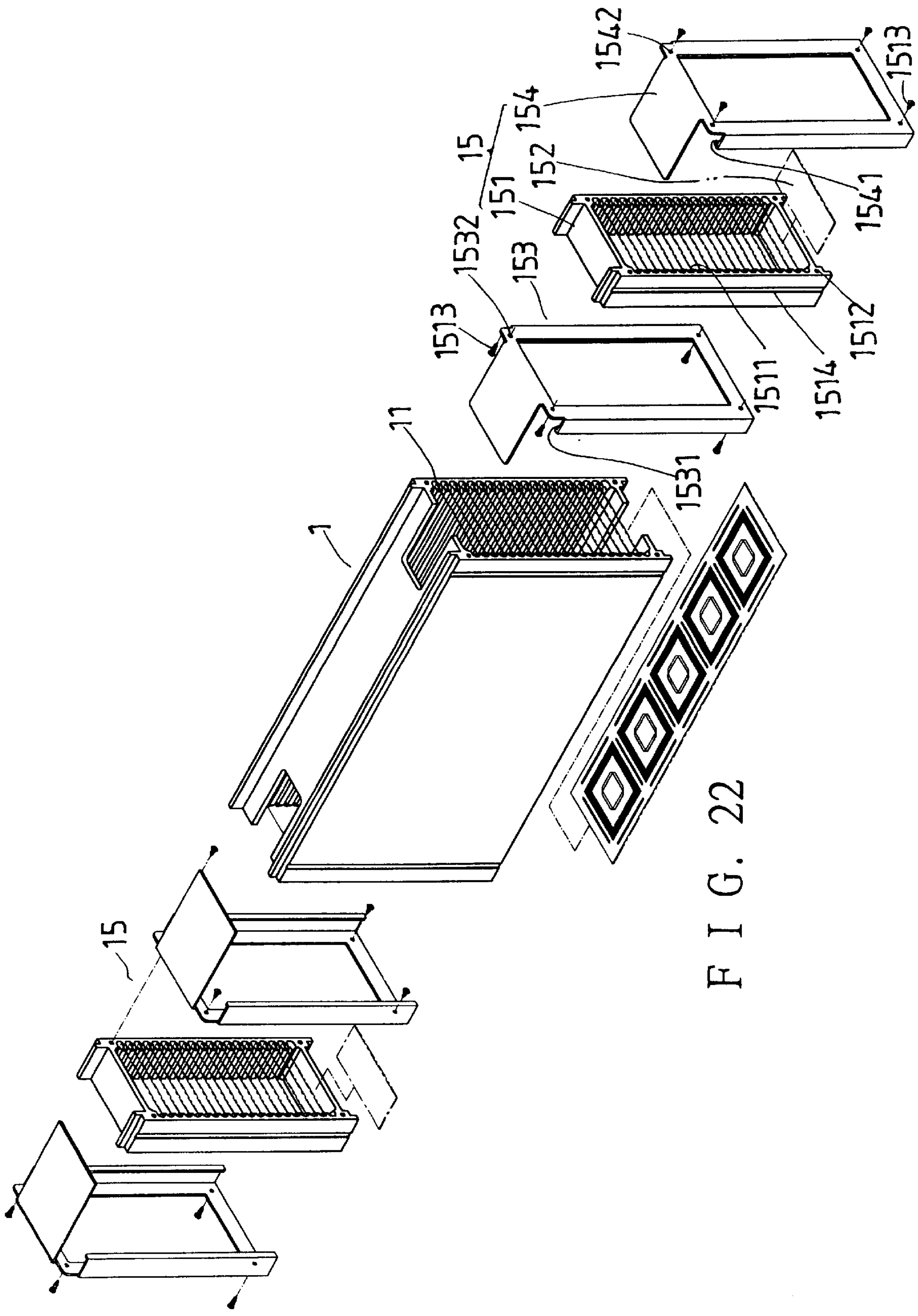
FIG. 22 is an exploded perspective view of the supporting racks of the cleaning device according to a third embodiment of the present invention.

Referring to FIGS. 12 and 13, when the plasma source 4 uses hollow cathode discharge, hollow negative electrodes 42 are disposed on two sides of the holding members 2; the hollow negative electrodes 42 have through holes 421. When negative voltage is applied to the hollow negative electrodes 42, and air is passed through the through holes 421 from outside, negative plasma will be produced on inner sides of the hollow negative electrodes 42; the plasma will flow into the supporting racks 1 to clean the plate-shaped things in the racks 1. Referring to FIGS. 13 and 14, when the plasma sources 4 use hollow cathode discharge (HCD), the metallic grid 5 is not a must. When the metallic grid 5 is not used, the hollow negative electrodes 42 having through holes have high voltage, and so have the function of the metallic grid 5. However, if the metallic grid 5 is used in the hollow cathode discharge, the cleaning device can be adjusted in a greater range in respect of its cleaning effect.

Referring to FIGS. 15 to 21, a magnetic field is provided on outside of the plasma source 4; namely, magnets 6 are disposed on outside of the plasma sources 4. The magnets 6 can be electromagnets or permanent magnets so as to provide axial direction or diametric direction of the magnetic field in respect of the plasma sources 4.

Moreover, buffer members 15 are provided; the buffer members 15 each has a rack part 151, several buffer plates 152, an inner frame 153 and an outer frame 154. The rack parts 151 each has elongated trenches 1514 on outer sides, and support protrusions 1511 corresponding to the support protrusions 11 of the supporting racks 1. The buffer plates 152 are each located on corresponding ones of the support protrusions 1511. The outer frame 154 has connecting protrusions 1541, which engage the elongated trenches 1514 of the rack part 151 when the frame 154 is connected to the rack part 151 with screws. The inner frame 153 also has connecting protrusions 1531, which engage elongated trenches (not numbered) of the support rack 1 when the frame 153 is connected to the support racks 1 with screws. Thus, the buffer plates 152 are protected from falling off the rack part 151 by the frames 153, 154. The buffer members 15 are connected to the support racks 1 when the support racks 1 don't have the covers 13 fitted to them. The buffer members 15 can help the plasma spread on the flat-board-shaped things to be cleaned in the support racks 1 evenly, preventing the outer portions of the things to be cleaned from being cleaned too much, and the intermediate portions from being insufficiently cleaned.

The buffer plates 15 can be made of metals, waste circuit boards or insulating plates such as Teflon.

Figure 23:
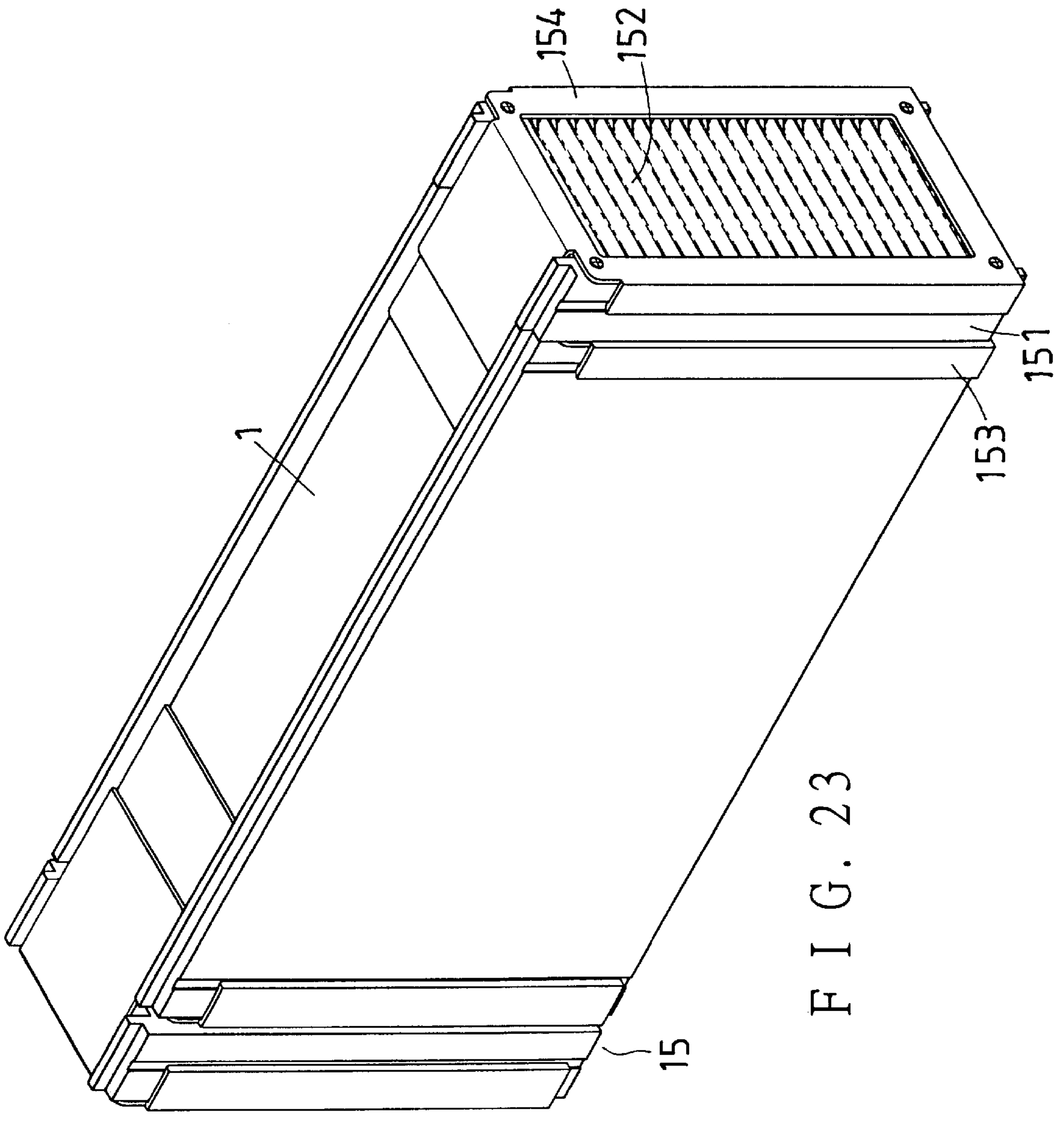
FIG. 23 is a perspective view of the supporting rack in FIG. 22.
Figure 24:
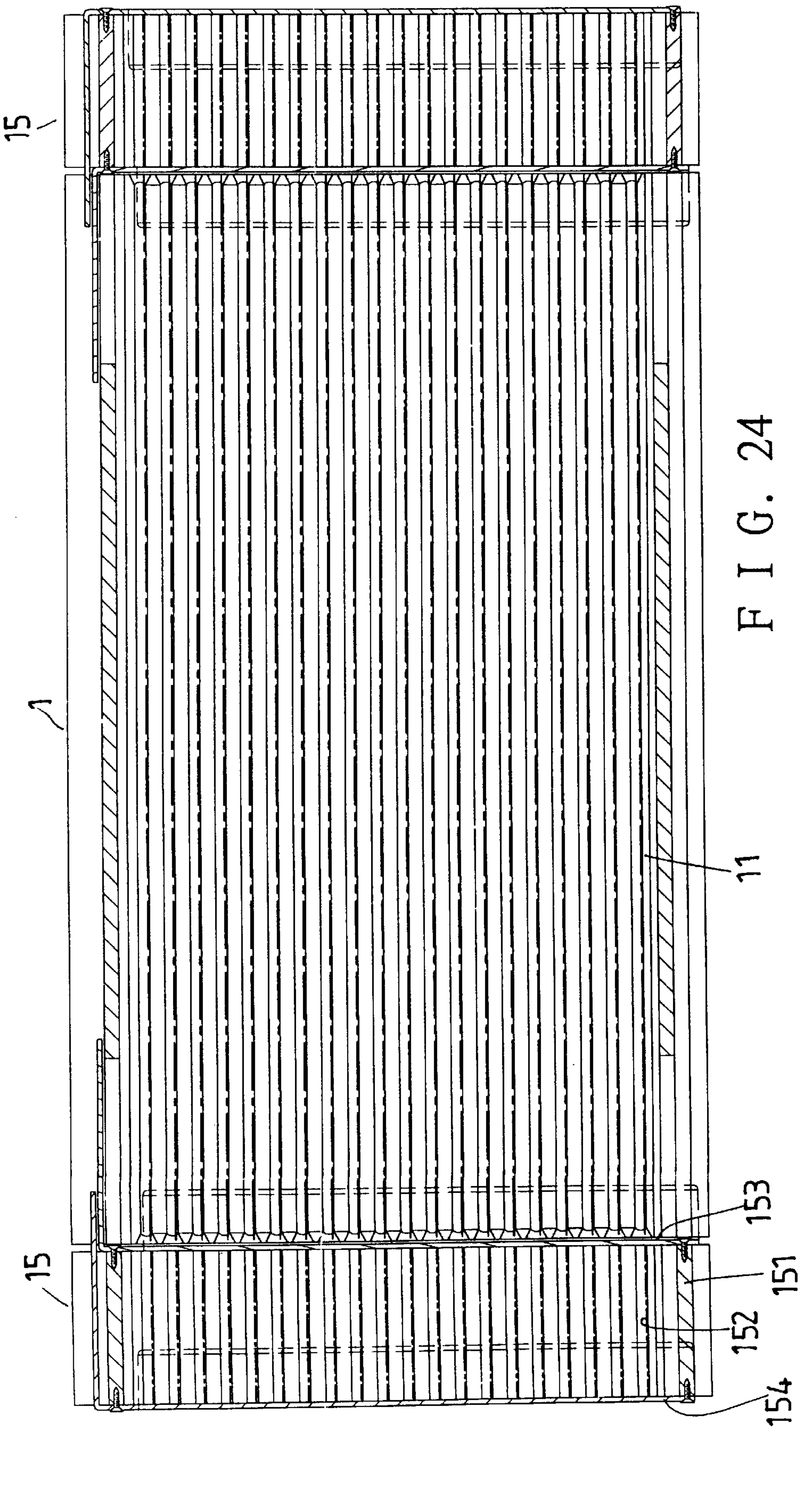
FIG. 24 is a cross-sectional view of the supporting rack in FIG. 22.

The things to be cleaned are located on the supporting protrusions 11 of the support racks 1, and the buffer members 15 are fitted to the support racks as above said, and as shown in FIG. 23. Referring to FIG. 24, the buffer plates 152 are each located at a same height as the corresponding things to be cleaned. Then, the support racks 1 are disposed in the cleaning device for the cleaning process.

From the above description, the cleaning device of the present invention can be known to have desirable features as follows.

1. It has relatively uncomplicated structure.

2. It has deeply reaching and evenly spreading plasma to sufficiently clean the boards to be cleaned.

What is claimed is:

1. A plasma cleaning system for deep cleaning workpieces comprising:

(a) a vacuum chamber, said vacuum chamber containing a gas introduced therein;

(b) at least one supporting rack disposed in said vacuum chamber, said supporting rack having first and second end portions;

(c) first and second plasma sources disposed to respectively oppose said first and second end portions of said supporting rack, said first and second plasma sources being operable to generate a plasma; and, (d) at least one metallic grid defining member disposed between each of said supporting rack first and second end portions and said first and second plasma sources, each said metallic grid defining member being actuated responsive to a predetermined electric voltage signal applied thereto for increasing the charge density of the plasma within said supporting rack.

2. The plasma cleaning system as recited in claim 1 wherein said metallic grid defining member includes a mesh structure having a mesh opening width within the approximate range of 1 to 20 millimeters.

3. The plasma cleaning system as recited in claim 1 wherein said metallic grid defining member includes a metallic plate having a plurality of through holes formed therein.

4. The plasma cleaning system as recited in claim 1 wherein said predetermined electric voltage signal is of a type selected from the group consisting of: a positive voltage direct current signal, a negative voltage direct current signal, a positive unipolar pulsed signal, and a negative unipolar pulsed signal.

5. The plasma cleaning system as recited in claim 1 wherein said predetermined electric voltage signal is a bipolar pulsed signal.

6. The plasma cleaning system as recited in claim 1 wherein said predetermined electric voltage signal is disposed in frequency within an intermediate frequency range.

7. The plasma cleaning system as recited in claim 1 wherein said predetermined electric voltage signal is disposed in frequency within an approximate range of 40 KHz to 13.56 MHz.

8. The plasma cleaning system as recited in claim 1 comprising a plurality of said supporting racks disposed substantially in parallel one relative to the other.

9. The plasma cleaning system as recited in claim 8 wherein said supporting racks are each formed of a conductive material for conducting a predetermined auxiliary electric signal applied thereto, said supporting racks being electrically isolated within said vacuum chamber by at least one insulating cushion.

10. The plasma cleaning system as recited in claim 9 wherein said predetermined auxiliary electric voltage signal is of a type selected from the group consisting of: a positive voltage direct current signal, and a negative voltage direct current signal.

11. The plasma cleaning system as recited in claim 9 wherein said predetermined auxiliary electric voltage signal is a pulsed voltage signal pulsed at a frequency within an approximate range of 0.1 to 500 KHz.

12. The plasma cleaning system as recited in claim 9 wherein said predetermined auxiliary electric voltage signal is an intermediate frequency alternating current signal having a frequency within an approximate range of 0.1 to 500 KHz.

13. The plasma cleaning system as recited in claim 8 further comprising a plurality of holding members receiving said supporting racks.

14. The plasma cleaning system as recited in claim 13 wherein said supporting racks are each formed of a conductive material for conducting a predetermined bias signal applied thereto, said holding member being formed of an insulating material.

15. The plasma cleaning system as recited in claim 13 wherein said supporting racks are each formed of a conductive material for conducting a predetermined bias signal applied thereto, said holding members being formed of a conductive material, said supporting racks being electrically isolated from said holding members by a plurality of insulating cushions disposed therebetween.

16. The plasma cleaning system as recited in claim 13 wherein said supporting racks are each formed of a conductive material, said holding members being formed of a conductive material for conducting a predetermined bias signal applied thereto, said supporting racks being electrically isolated from said holding members by a plurality of insulating cushions disposed therebetween.

17. The plasma cleaning system as recited in claim 1 wherein said first and second plasma sources each include an inductively-coupling portion.

18. The plasma cleaning system as recited in claim 17 wherein said first and second plasma sources each include an antenna receiving a high frequency power signal.

19. The plasma cleaning system as recited in claim 1 wherein said first and second plasma sources each include a hollow cathode discharge portion.

20. The plasma cleaning system as recited in claim 1 wherein said first and second plasma sources each include a hollow cathode discharge portion, each said hollow cathode discharge portion defining one said grid defining member.

21. The plasma cleaning system as recited in claim 19 or 20 wherein said hollow cathode discharge portions define hollow negative electrodes respectively disposed opposing said first and second end portions of said supporting rack, said hollow negative electrodes each having a plurality of through holes formed therein, said hollow negative electrodes generating a flow of negative plasma responsive to the application of a predetermined negative voltage signal thereto.

22. The plasma cleaning system as recited in claim 1 wherein said first and second plasma sources each include at least one of a helicon coupling and capacitive coupling portions.

23. The plasma cleaning system as recited in claim 8 further comprising first and second magnetic field members respectively disposed adjacent said first and second plasma sources for generating a magnetic field directed therebetween.

24. The plasma cleaning system as recited in claim 23 wherein said first and second magnetic field members each include a permanent magnet.

* * * * *